(12) United States Patent
Stummer

(10) Patent No.: US 7,118,513 B2
(45) Date of Patent: *Oct. 10, 2006

(54) SYSTEM FOR THE CONTROL OF MULTIPLE TRANSMISSIONS IN A MULTI-COMBINATION VEHICLE

(75) Inventor: Mark J. Stummer, Driver (AU)

(73) Assignee: James W. Cooper, North Territory (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/177,763

(22) Filed: Jul. 7, 2005

(65) Prior Publication Data

US 2006/0003864 A1    Jan. 5, 2006

Related U.S. Application Data

(63) Continuation of application No. 10/386,889, filed on Mar. 12, 2003, now Pat. No. 6,973,981.

(51) Int. Cl.
*B60K 5/08* (2006.01)
(52) U.S. Cl. .................. 477/2; 477/3; 701/23; 701/24; 180/14.2; 180/14.6
(58) Field of Classification Search .................... 477/2, 477/3; 180/14.2, 14.6, 24.06; 701/23, 24
See application file for complete search history.

(56) References Cited

U.S. PATENT DOCUMENTS

| | | | | | |
|---|---|---|---|---|---|
| 4,892,014 | A | * | 1/1990 | Morell et al. | 477/92 |
| 5,481,456 | A | * | 1/1996 | Ogura | 701/1 |
| 5,914,575 | A | * | 6/1999 | Sasaki | 318/150 |
| 6,062,801 | A | * | 5/2000 | Cooper | 414/470 |
| 6,202,012 | B1 | * | 3/2001 | Gile et al. | 701/48 |
| 6,419,037 | B1 | * | 7/2002 | Kramer et al. | 180/14.2 |
| 6,699,155 | B1 | * | 3/2004 | Nagasaka | 477/94 |
| 6,973,981 | B1 | * | 12/2005 | Stummer | 180/14.2 |
| 2002/0056579 | A1 | * | 5/2002 | Cooper | 180/14.2 |
| 2003/0064854 | A1 | * | 4/2003 | Kotani | 477/3 |

* cited by examiner

*Primary Examiner*—Rodney H. Bonck
*Assistant Examiner*—David D. Le
(74) *Attorney, Agent, or Firm*—Francis Law Group

(57) ABSTRACT

A multi-combination vehicle having at least two engines, each engine having a transmission coupled thereto, each transmission including an electronic control unit, each engine including an electrical power source adapted to provide power to a respective one of the electronic control units. The multi-combination vehicle further including an electronic gear selector in communication with each transmission, the gear selector having a power input and a gear selector output, and a gear selector module that is provided power from the electronic control units, the gear selector module including a manual switching device that is adapted to selectively provide the electronic control unit power.

4 Claims, 10 Drawing Sheets

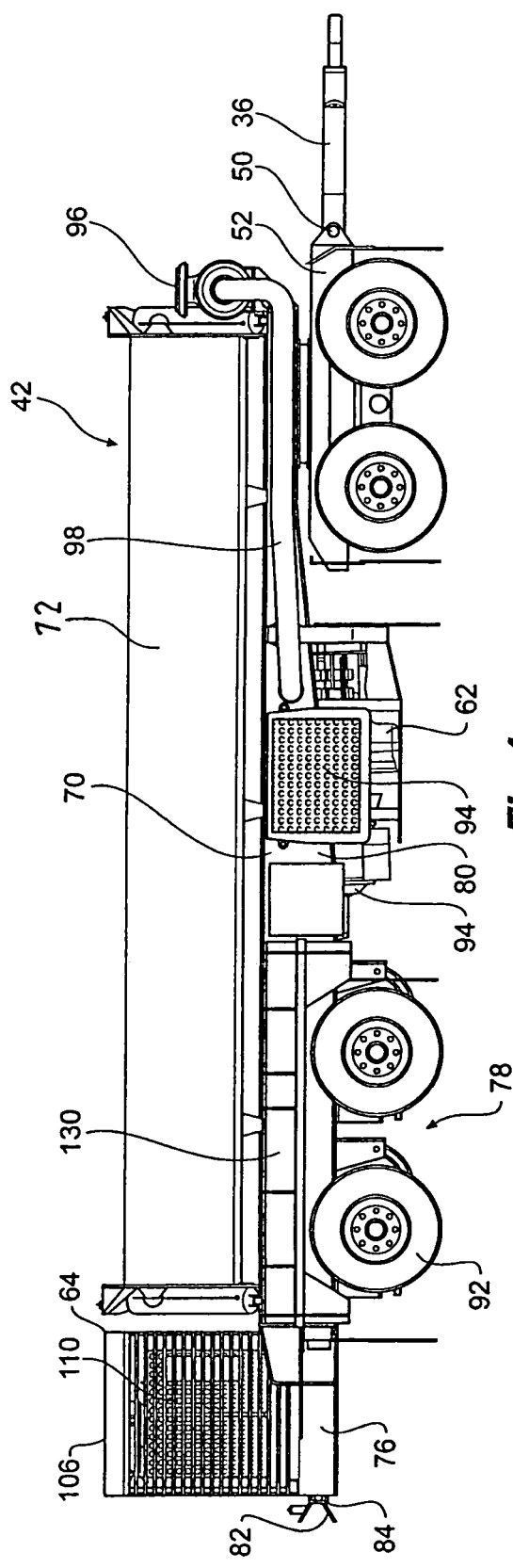
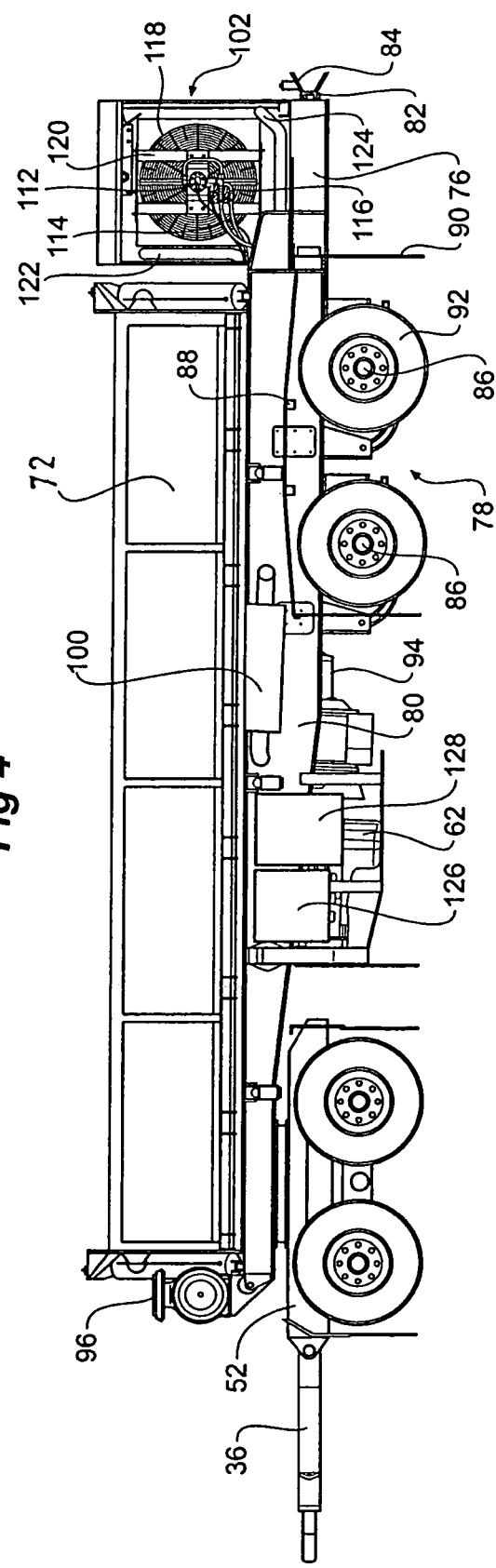

SYSTEM FOR THE CONTROL OF MULTIPLE TRANSMISSIONS IN A MULTI-COMBINATION VEHICLE

This application is a continuation of U.S. application Ser. No. 10/386,889, filed Mar. 12, 2003, now U.S. Pat. No. 6,973,981, which claims priority based on 35 U.S.C. 365(c) from PCT/AU02/00668 filed May 24, 2002, which is hereby incorporated by reference.

BACKGROUND

1. Field of the Invention

The present invention is directed to transmission control systems and, more particularly, to a system for the control of multiple transmissions in a multi-combination vehicle, such a multi-combination vehicle being particularly useful in hauling mined payload from mines.

2. Related Art

Operators of mines are constantly searching for ways to reduce the costs associated with mined products. One of the most significant costs in operating a mine is transporting the mined material from the ore face to a processing plant. This is exacerbated when the mined payload is of low grade, that is, the desired mineral or metal is only a small percentage by weight and/or volume of the mined ore so that substantial amounts of ore have to be handled to extract a small percentage of desired material. A further problem that occurs is where the ore has to be handled several times.

There are several ways that ore can be transported from the ore face to the processing plant, depending on the type and configuration of the mine.

Underground mines typically have a central lifting or winding shaft to bring the mined ore to the surface. These shafts require a dedicated receival point. To get the ore to that point mines typically have a dedicated rail system that is level and route specific. Underground mine haulage or dump trucks are used to transport the ore from various mining levels both above and below the rail haulage level to the dedicated rial system that then transports the ore to the lifting shaft receival point. The trucks are always a single unit that is either rigid or pivot steer. This type of arrangement has a number of distinct disadvantages.

The dump trucks cause a significant amount of hot air per ton of ore hauled to be exhausted into the mine. Cold ventilation air has to be continually pumped into the mine via ventilation shafts, and one of the major costs in establishing underground mines is the construction and drilling of ventilation shafts. Because of the limitation of currently known dump trucks, the time that they can operate underground is limited, particularly due to excess heat they produce. To reduce the heat, the dump trucks have to move relatively slowly.

A railway system, especially one underground, is relatively expensive to install and operate due to the cost of acquiring the locomotive and installing the fixed railway system and the associated maintenance costs. Furthermore the underground railway system being route-specific is not flexible to changes in route without incurring the expense of installing additional railway tracks. As each new mining area opens, it is necessary to incur the cost of installing new track for the railway system, or use the dump trucks as described above whose efficiency decreases with increasing distances they have to travel.

The central lifting or winding shaft is quite expensive, the cost running into tens of millions of dollars and is of a fixed location. As the mine expands the distance from the ore face to the central shaft becomes important in the cost of operating the mine.

In some instances mines have utilized conveyor belts instead of the railway system and/or the lifting shaft. The difficulty with conveyor belts is that once again they are route specific, are quite expensive to install and maintain. Miners are also concerned that the belts may catch fire that would starve the area of oxygen.

In some instances the dump trucks may be used to transport the ore directly above ground. Because of the limitations described above, especially low speed and the heat they produce and with the inclination within underground mines generally being constant, the depth of a mine that can be realistically accessed by these dump trucks is therefore limited, typically to a depth of hundreds of metres.

When the ore has been transported to the surface, or in the case of an above ground mine, it is then necessary to transport the ore to a central processing plant.

One of the ways that this may be accomplished is by using conventional off-highway dump trucks than can either be a single rigid, pivot steer unit or an articulated vehicle consisting of a very short wheelbase earthmoving type or tractor unit coupled to a single hauled or carrying unit and virtually job specific. These units are designed to be a link in the chain of the actual mining, digging or producing the any product. Their main function is to move product literally from the ore face to a receival point through the shortest possible distance are not route-specific. The shorter the route the more economical they are, conversely, their ton of ore transported per distance costs increase dramatically over longer routes. They are therefore not suitable for hauling ore great distances, thereby limiting the distance that ore can be transported at a reasonable cost. As such, these trucks are not suitable when there may be satellite mines, that is, mines that are some distance away from the processing plant. In particular, these trucks have never been designed to be a transportation system for various reasons including the following:

(a) Their axle loadings are extreme and require appropriate roading and bridging. Wheeled or articulated dump trucks with large tires carry a significant loading per axle, up to 33 tons per axle.
(b) These types of trucks are designed for hauling loads over relatively short distances and rough terrain, have relatively large tires for relatively slow speed operation and are relatively expensive to operate and maintain due to fuel and tire costs.
(c) They produce too much heat in both their drive trains and tires. Furthermore they have poor power-to-weight ratios and low operating efficiencies.
(d) Their mass requires a large vehicle cross-section both in height and width.
(e) Their discharge methods are either: direct end-tip (non-captive) where the center of gravity is always raised, or bottom-dump in the single articulated hauling vehicle that keeps the center of gravity down but is discharge-captive.

An alternate way of transporting the ore to a central processing plant includes conventional transportation systems such as conveyor belt systems and rail systems, both routes being captive. Problems with these systems have been discussed above.

Another way of transporting the ore is by using highway-type road vehicle combinations or multi-combination vehicles. These vehicles are limited by their horsepower, tractive or braking efforts or capacities, manufacturers' ratings of various componentry, directional stability behavior, swept path characteristics, gradability and startability.

As a result, currently known systems for the extraction of ore from mines set limits on the commercial usefulness of mines simply due to the cost of transporting the ore.

As discussed above, multi-combination vehicles such as over-the-road vehicles are known and include a truck coupled to a plurality of trailers and converter dollies. Until recently these vehicles have included a single power source, generally a diesel engine, with the vehicles being limited to a payload of some 170 tons, and a gradient not exceeding 5%. These multicombination vehicles, commonly referred to as "road-trains", have been in use for some time, particularly in Australia, for the purpose of hauling mined products, or the commodities of other industries, over aboveground roadways. Conventional aboveground road-trains are typically designed for use at relatively high speed and on relatively flat ground. They are limited by their horse power, tractive or braking efforts and their capacities that are defined by manufacturers ratings, directional stability behavior, swept path characteristics, gradability and startability. Accordingly they have limited uses for operation in mines.

The location of the mechanical couplings between each adjacent pair of vehicles in a multi-combination vehicle as described above is positioned to maintain the side-to-side sway, or yaw, of the last vehicle within acceptable limits for above-ground, over-the-road applications. The location is not compatible for operation within an underground mine due to the relatively low operating speeds as well as the relatively narrow tunnels and small radius bends found in underground mines.

Specially configured multi-combination vehicles have been developed recently which have a significantly reduced swept path width as compared to conventional aboveground road-trains. This enables these vehicles to be used to transport various payloads such as mined ores, over the roadways existing in an underground mine. U.S. Pat. No. 6,062,801 issued on May 16, 2000 and U.S. Pat. No. 6,361,269 issued on Mar. 26, 2002, each expressly incorporated by reference herein in its entirety, describe these specially configured multi-combination vehicles which may be used in underground mines. The vehicles can operate in a tunnel system with restricted height, width, swept paths and directional path and can comply with a predetermined behavior pattern obviating the need for the rail or conveyor system.

Even after the advent of the foregoing specially configured multi-combination vehicles, various operational problems remained to be solved with regard to the transport of mined ores, in both underground and aboveground applications. For instance, due to the heavy loads of the road-train combination, the traction provided by the powered wheels of a road-train, usually provided to two rear axles, was insufficient to satisfactorily negotiate the gradients associated with the declines providing ingress and egress to and from some underground mines. Alternatively, these declines into underground mines would have to be constructed at a much gentler slope leading to excessively long tunnels. In addition, the relatively low speed of the road trains underground due to the size of the tunnels and safety considerations results in road-trains traveling underground for a significant length of time, even up to an hour in some cases. This places strain on the road-train cooling system, which is typically designed for aboveground road-trains-travelling at significant speeds, generally around 80 km/h and the engines are prone to overheating.

Also, before the introduction of multi-combinational vehicles incorporating a power trailer (i.e., one having a source of motive power), which are subsequently discussed in detail, multi-combination vehicles for dedicated road haulage therefor such as mineral concentrate haulage operated at a 170 ton payload, as noted previously. However, there is a practical limit to the payload of the multi-combination vehicle with a single truck. Since the cost of haulage is determined mainly on weight, if one can increase the total haulage that can be moved by a single vehicle that does not require additional operators, the cost benefit is substantial. This is especially so if ore can be hauled directly from within a mine to a processing plant without needing to be reloaded onto another transport system.

In order to further improve multi-combination vehicles and provide even greater advantages to the operators using these vehicles, multi-combination vehicles have been developed which utilize a truck and an additional motive power source advantageously located within the chassis of a trailer and which include a unique cooling system that enables operation of the multi-combination vehicle at low speeds, on steeper gradients and with a greater payload than previously known. International Patent Application No. PCT/AU01/01154, expressly incorporated by reference herein in its entirety, discloses a multi-combinational vehicle including a power trailer having an engine that overcomes the foregoing problems of traction and cooling of such multi-combination vehicles. International Patent Application No. PCT/AU01/01568, also expressly incorporated by reference herein in its entirety, discloses various features that may be incorporated in the drive trains of multi-combination vehicles of this type. These multi-combination vehicles, which have the ability to traverse different mining levels, have removed the need for conventional dump truck haulage from the ore face to the rail head, and also have enabled the vehicle to haul ore directly from the ore face from any underground level via an access tunnel directly to a processing plant, thereby eliminating the need for the lifting shaft. Furthermore, these types of multi-combination vehicles coupled with specifically configured power trailers, typically B-double trailers, can be used above ground to transport ore directly to a processing plant eliminating the need for other dump trucks, increasing the total payload from some 170 tons to 270 tons whilst staying within the manufacturers rating and at the same time increasing the general behavior pattern, thereby creating a safer multi-combination vehicle.

Use of a multi-combination vehicle using a truck and a power trailer provides a further significant advantage over conventional single-engine dump trucks, and over multi-combination vehicles having only a truck. Even if the truck or power trailer transmission were to fail, the second engine and transmission can be used to at least move the multi-combination vehicle out of the way or even bring it to the surface for analysis and repair. As known in the art, in the event of engine and/or transmission failure it is more than a simple exercise to retrieve a single-engine dump truck from the depths of an underground mine that is then blocking the underground road from use by other trucks. A similar problem may exist with multi-combination vehicles powered only by a single truck, or in some instances a single prime mover.

One of the problems in a multi-combination vehicle having two transmissions is controlling the transmissions so that they do not work against each other. Further, current transmissions used not only in dump trucks but also in multi-combination vehicles include complex Electronic Control Units that control the operation of the transmissions.

Not only do they select the optimal transmission gear but they also provide diagnostic fault codes that indicate to an operator the operable status of the transmission. The transmissions are designed to take into account various parameters such as operating temperatures and to effectively go to safe mode if these fall outside predetermined values, safe mode typically being a direct coupling of the transmission, generally one gear below high gear. Whilst the transmissions will still provide power to the wheels, the driver cannot change gears and once the vehicle slows down and stops, as would usually happen over time, the transmission selects neutral, and the driver simply cannot re-engage the transmission. The whole vehicle then has to be towed to an appropriate facility for a full analysis and/or repair of the Electronic Control Unit or the transmission.

If for whatever reason the transmission were to fall to safe mode and then to neutral once the vehicle stops, the present invention provides for the ability for the second engine and its transmission to be able to propel the multi-vehicle combination so that it may be driven to an appropriate repair facility.

The inventor is unaware of any multicombination vehicle, whether it is for above ground or underground use of the type just described, which is capable of operating when one of the transmissions has failed.

In view of the foregoing disadvantages and limitations associated with known load-carrying vehicles, a commercial need exists for an improved load-carrying vehicle combination for use both aboveground and in underground mines that overcomes at least some of the abovementioned problems or provides the public with a useful alternative.

SUMMARY OF THE INVENTION

Accordingly, the present invention discloses a control system for use in multi-combination vehicles that enables operation of the multi-combination vehicle or "road-train" even when one of the transmissions has failed or is inoperable. This enables the operator of the multi-combination vehicle to continue operating the vehicle until it is moved to a safe position. This provides significant operational advantages for the operator of the vehicle. According to one aspect of the present invention, a system is provided for the control of multiple transmissions in a multi-combination vehicle having at least two engines, each engine having its own electrical power source and being drivingly coupled to one of the transmissions, each of the transmissions having an electronic control unit provided power from the respective engines power source. According to one embodiment of said present invention, the system comprises:

an electronic gear selector, said electronic gear selector having a power input and a gear selector output representative of a desired operation of each of the transmissions;

a gear selector module that is provided power from each of the electronic control units and selectively provides power to said power input of said electronic gear selector from a selected one of the electronic control units;

said gear selector output of said electronic gear selector being in communication with at least the selected one of the transmission electronic control units.

According to a second aspect of the present invention, a multi-combination vehicle is provided. According to one embodiment of the present invention, the multi-combination vehicle includes:

a powered towing unit having a first transmission, said first transmission including a first power source and a first electronic control unit;

a plurality of trailers, said powered towing unit and said trailers being mechanically coupled to one another in a series arrangement;

a power trailer having a second transmission, said second transmission having a second power source and a second electronic control unit, said power trailer mechanically coupled in said series arrangement to the plurality of trailers and said powered towing unit;

an electronic gear selector, said electronic gear selector having a power input and a gear selector output representative of a desired operation of said first and second transmissions;

a gear selector module which is provided power from said electronic control units of said first and said second transmissions and selectively provides power to said power input of said electronic gear selector from a selected one of said electronic control units;

said gear selector output of said electronic gear selector being in communication with at least said selected one of said electronic control units.

BRIEF DESCRIPTION OF THE DRAWINGS

These and other features, aspects, and advantages of the present invention will become better understood with regard to the following description, appended claims and accompanying drawings wherein:

FIG. 4 is a right hand side elevation view of the power trailer shown in FIG. 2;

FIG. 5 is a left side elevation of the power trailer shown in FIG. 2;

DESCRIPTION OF THE PREFERRED EMBODIMENT

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Figure 1:
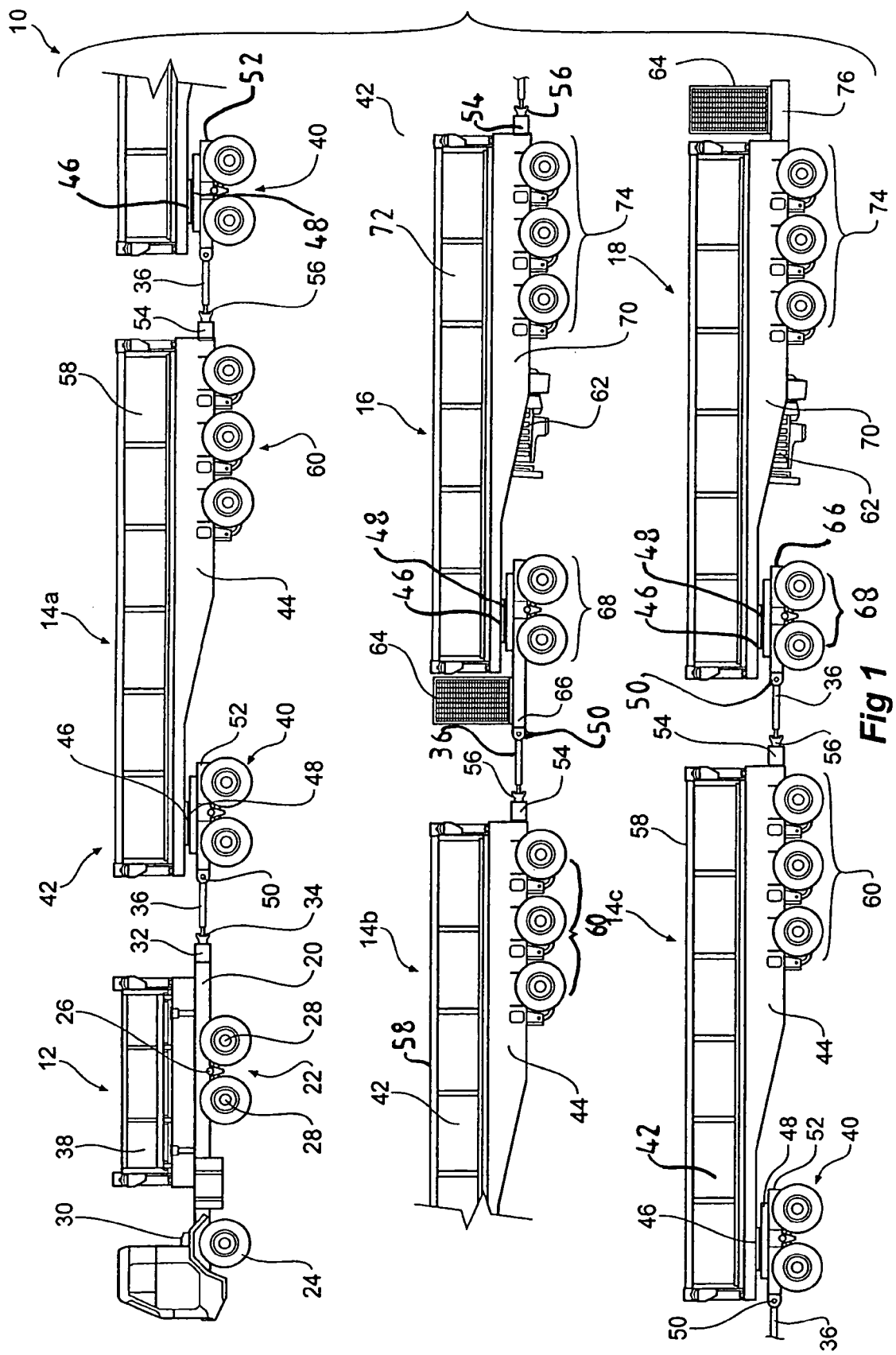
FIG. 1 is a left side elevation of a multi-combination vehicle according to one embodiment of the present invention, with the vehicle incorporating several vehicle trailers and several power trailers.
Figure 2:
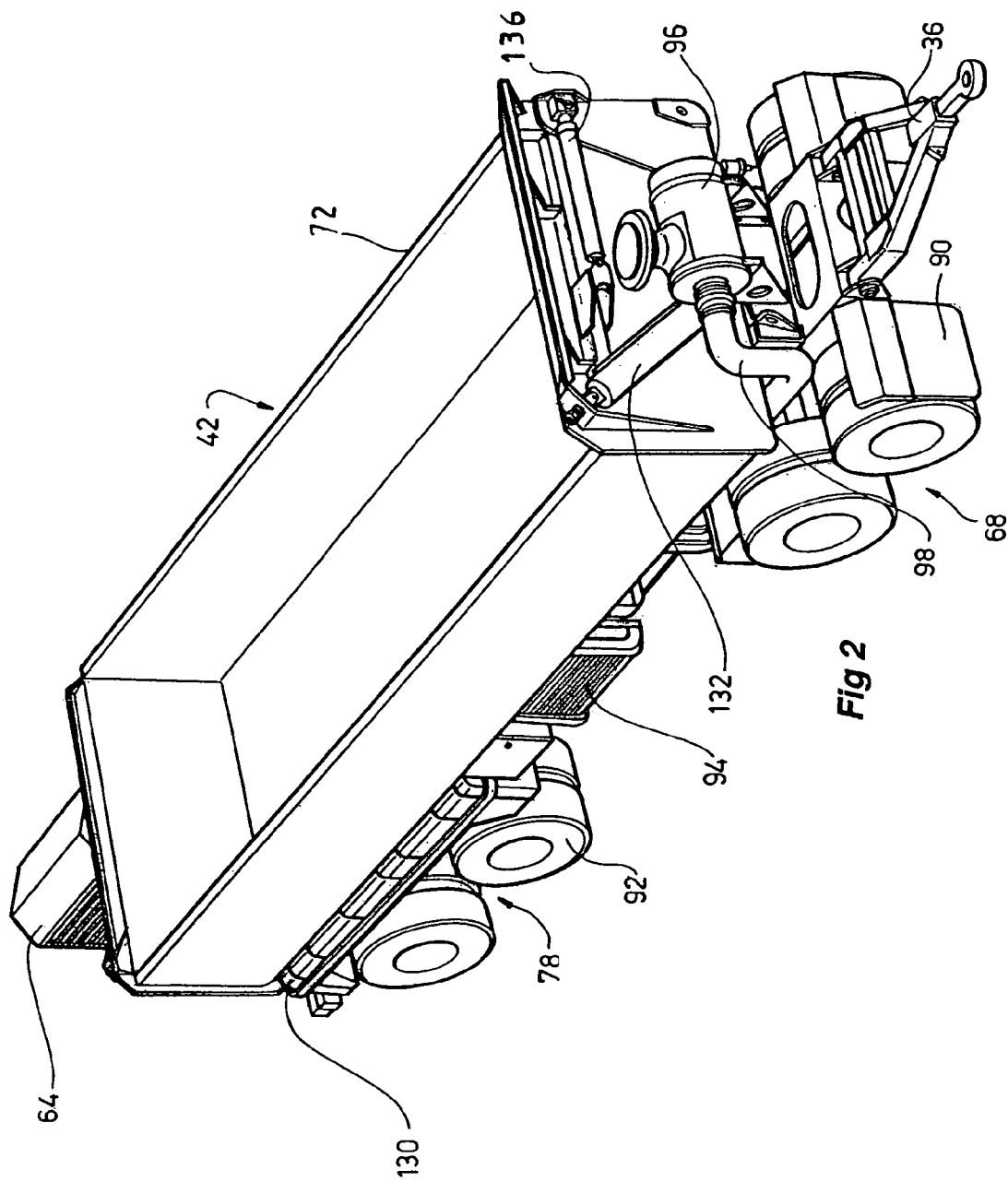
FIG. 2 is a front perspective view of a power trailer included in the multi-combination vehicle according to the present invention.
Figure 3:
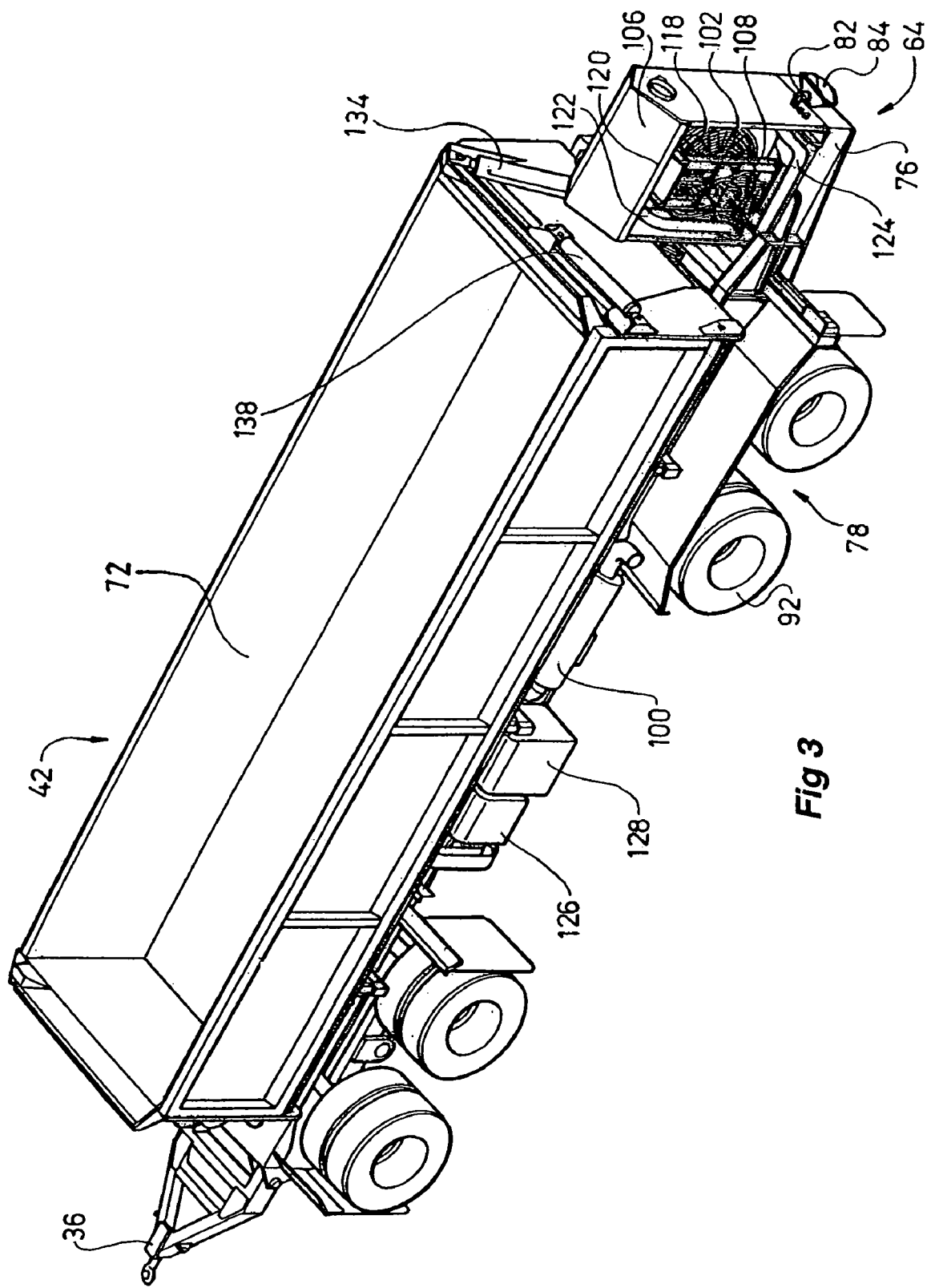
FIG. 3 is a rear perspective view of the power trailer of FIG. 2.

Turning now to the drawings in detail there is shown in FIG. 1 a multi-combination vehicle 10 including a truck 12 mechanically coupled to a plurality of trailers 14. A power trailer 16 extends from forwardly located trailers 14a and 14b and a further trailer 14c is coupled to the power trailer 16. A second power trailer 18 is coupled to the last trailer 14c. It is however to be understood that the multi-vehicle combination may include one or more power trailers, depending on the application.

The truck 12 includes a chassis or frame 20 and a rear axle assembly 22, which is suspended from and disposed below the chassis 20. Forward axle 24 comprises the steering axle of the truck 12. The rear axle assembly 22 is suspended from chassis 20 via suspension 26 and includes wheeled axles 28. Both of the wheeled axles may be driving axles, or alternatively only one is a driving axle. The driving axles may be a tridem axle assembly in lieu of the tandem axle assembly 22 and possibly suspended with a mechanical suspension.

The truck 12 further includes a motive power source 30 and a transmission (not shown) for transmitting torque from the motive power source 30 to the drive axles 28. Typically the motive power source comprises a diesel engine and the transmission for transmitting torque from the engine 30 to the drive axles 28 includes a gear box, a drive shaft, and a differential (not shown). Alternatively, the motive power source 30 may comprise other types of internal combustion engines utilizing a variety of fuels.

The truck includes a draw frame 32 attached and rearwardly extending from the chassis 20. A coupling 34 is attached to the rear of the draw frame 32 and connected with a drawbar 36 on the trailer 14a. A bin 38 accommodates payload to be carried by the truck and may be adapted to be side tipping by being hingedly attached to the frame 20 (not shown).

Each of the trailers 14a, 14b, and 14c includes a converter dolly 40 and a semi-trailer 42, said semi-trailer having a chassis 44, a forward end with a coupling system 46 that pivotably attaches to a ball-race turntable 48 on the converter dolly. This enables the converter dolly to pivot relative to the semi-trailer about a generally vertical axis of rotation passing through the centre of the ball-race turntable. Other embodiments may however equally well be used, such as an oscillating ball-race turntable or a grease plate. The drawbar 36 is hingedly connected through pivot 50 to the chassis 52 of the converter dolly 40 and accommodates for any change in the grade of the road surface. As with the truck, the trailers 14a, 14b, and 14c, further include draw frames 54 attached and rearwardly extending from the chassis 44. A coupling 56 is attached to the rear of the trailer draw frames 54 and is connected with a drawbar 36 on the next trailer or power trailer. A bin 58 accommodates payload to be carried by the trailer and may be adapted to be side-tipping by being hingedly attached to the frame (not shown). Each trailer includes a rear axle assembly 60 typically having three axles, the mechanical details of which are well known in the art.

Power trailer 16 is coupled to trailer 14b using coupling arrangements as described above. The power trailer 16 includes the same mechanical features as with the other non-powered trailers 14a, 14b, and 14c, such as semi-trailer 42, with the addition of an engine 62 suspended generally half-way along chassis 70 and a cooling means 64 located at the front of the power trailer 16 positioned to take into account the movement necessary during a turn. Extending the chassis 66 of the power trailer dolly 68 enables the addition of the cooling means 64. Alternatively, although not shown, the cooling means 64 may be accommodated on the front of the chassis 70 of the power trailer by shortening the bin 72 when compared with the bin 58 of a non-powered trailer. A transmission system provides motive power to the rear axle assembly 74 of the power trailer 16.

Power trailer 18 also includes engine 62 mechanically coupled to the rear drive axle assembly 74 but includes the cooling means 64 located at the rear of the power trailer thereby eliminating the requirement for the extra length in the chassis of the dolly as was the case in power trailer 16 and instead extending the rear 76 of the chassis 70 to support the cooling means 64.

Referring to FIGS. 2–5, there is illustrated a power trailer such as power trailer 18 having the cooling means 64 at the rear end thereof but having a double axle rear axle assembly 78. The power trailer includes semi-trailer 42 having a chassis 70 including a rear extension 76. The chassis 70 includes a pair of longitudinally extending side members 80 and a plurality of transverse cross-members (not shown) interconnecting and attached to the side members 80. The rear axle assembly 78 is suspended from chassis 70 typically by air suspension (not shown). Alternatively the semi-trailer 42 may include a conventional mechanical spring assembly. The side members 80 support or form part of the load carrying structure such as bin 72. The load carrying structure may be a side tipping trailer, a stock crate, a fuel tank, or any other type of structure for supporting a load. As with the truck and non-powered trailers, the power trailer includes a draw frame 82 attached and rearwardly extending from the chassis 70. A coupling 84 is attached to the rear of the draw frame 82 and connected with a drawbar 36 on the next trailer or power trailer and may be adapted to be side-tipping by being hingedly attached to the chassis 70 (not shown).

The rear axle wheel assembly 78 includes wheeled axles 86. Extending above said wheeled axles are members 88 that may be used to support mudguards and the like 90. The wheeled axles 86 include a plurality of tires 92 mounted thereon for supporting the semi-trailer as it travels over a road surface.

Mounted within chassis 70 is a motive power source or engine 62 suspended generally centrally between the side members 80 and centrally within the chassis 70. A transmission 94 provides driving power from the engine 62 to the axle assembly 78 where one or more of the wheeled axles 86 may be driven. The engine is typically a diesel engine and may be advantageously include a turbocharger (not shown). To be able to fit the engine 62 in between the side members 80, the separation between the side members 80 is generally larger than that conventionally found on existing semi-trailers. However, the standard width of the wheeled axles is kept the same to keep the vehicle roadworthy. This has necessitated mounting the power trailer suspension under the side members rather than on their side. The engine 62 is supplied with combusting air through an air inlet 96. The air is then fed through to the engine via air pipe 98 and through appropriate filters. Exhaust gases are vented from the engine through exhaust outlet 100.

The cooling means 64 includes a radiator 102 to assist in cooling the engine by using an appropriate cooling fluid or coolant. In this particular advantageous embodiment the engine cooling means or the radiator 102 is mounted at the rear of the power trailer on top of frame extension 76 that extends further rearwardly from the chassis 70. Typically, the length of the frame would be extended to accommodate the radiator positioned along the frame. However, the frame may very well remain the same length as in conventional trailers, but the length of the bin 72 would be shortened to provide sufficient space to accommodate the radiator.

The radiator 102 includes coolant coils mounted in a housing 106. An air fan 108 is mounted behind coils and is driven to draw air through the coils. Located in front of the coils is a grill 110 to offer some protection to the coils from damage by debris. The air fan 108 typically includes a hydraulic motor 112 driven by the supply of hydraulic fluid through conduits 114 and 116. The air fan 108 is also housed in a protective grill 118 and is supported in position by support bars 120 extending between the top and bottom of the housing 106.

Coolant is supplied to the radiator through inlet pipe 122 and back to the engine through outlet pipe 124. The significant distance between the radiator and the engine means that the length of pipes transporting the coolant is quite long. This in itself provides an advantage in that the volume of coolant for the engine system has been greatly increased as compared to conventional engine designs where the radiator is located in front of the engine. The volume of the pipes effectively acts as a large coolant store.

Located around the engine are various compartments 126 and 128 that house the necessary control and sensing equipment for the engine such as engine starting controls and diagnostic instruments. Typically these systems include communication means with the truck so that the driver is kept advised as to the general status of the power trailer engine.

Power trailer fuel tanks 130 are located above the right hand side of the rear axle assembly 78 and act as pseudo mudguards. Side-tipping hydraulic arms 132 and 134 are provided at the front and rear of the bin respectively whilst arms 136 and 138 control opening the side of the bin 72.

Figure 6:
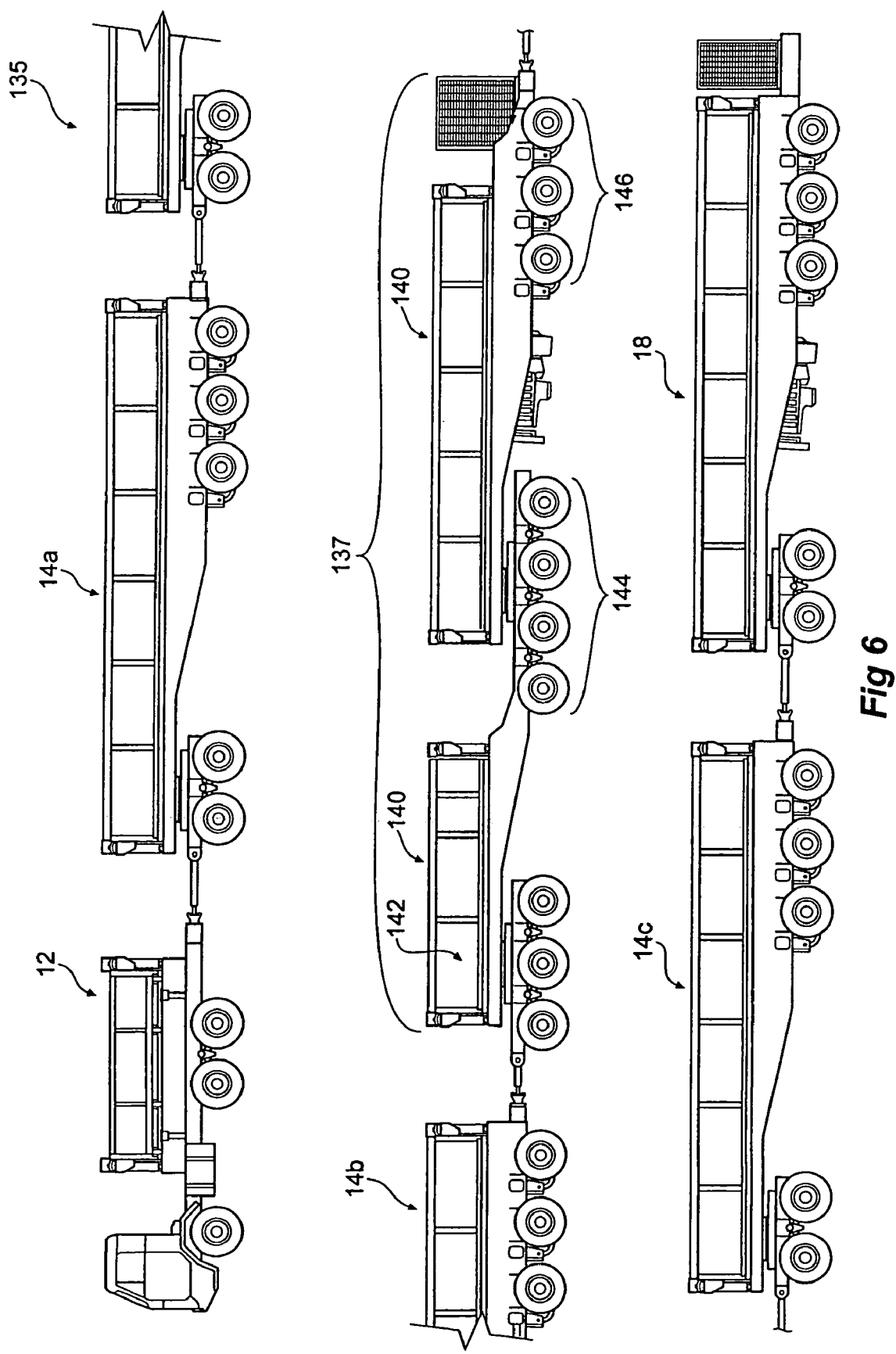
FIG. 6 is a left side elevation view of a multi-combination vehicle according to an alternative embodiment of the present invention.

FIG. 6 illustrates a multi-combination vehicle 135 wherein instead of a power-trailer as illustrated earlier, there is at least one "B-double" trailer 137 incorporating a power trailer 140 coupled to a trailer 142. The trailer 142 includes a rear axle assembly 144 that acts as a dolly for the power trailer 140. Power trailer 140 includes a tri-axle rear axle assembly 146, the configuration of the other components being similar to those described earlier and well known in the art. Rear axle assembly 144 is a quad-axle assembly. It is however to be understood that the assembly may have less axles than shown, such as a tri-axle assembly. A B-double trailer 137 configuration has been found to provide improved directional stability. In the case of a long multi-combination vehicle, this enables the operator to assemble a multi-combination vehicle having a total combination of approaching up to 10 trailers and power trailers.

The above description illustrates a multi-combination vehicle 135 having multiple power trailers and a single prime mover or truck. We now discuss the operating control systems of such a multi-combination vehicle. For ease of understanding we will discuss an embodiment where there is only one truck and one power trailer. It is however to be understood that the control system may equally well apply to one or more power trailers and it is not intended to limit the present application to a multi-combination vehicle having only one power trailer.

The throttle control of the engines of a truck and the power trailer depend on the configuration of the transmission system of the truck and the transmission system of the power trailer. Since a driver would not be able to control manual transmission systems of two engines, the transmission system of the power trailer is an automatic one.

Each of the engines includes engine on-board computer management systems, which not only measure a number of parameters such as the torque, fuel injected, and the engine rpm's (revolutions per minute) but also enable a throttle input to be used to drive the engine. Whilst its own throttle may control each engine separately those skilled in the art would appreciate the difficulty of controlling such a multi-combination vehicle where there were separate throttles and typically the power trailer engine is operated assuming a load all the time, that is, "flat out". This is undesirable for many reasons including stability of the multi-combination vehicle as well as fuel consumption.

Figure 7:
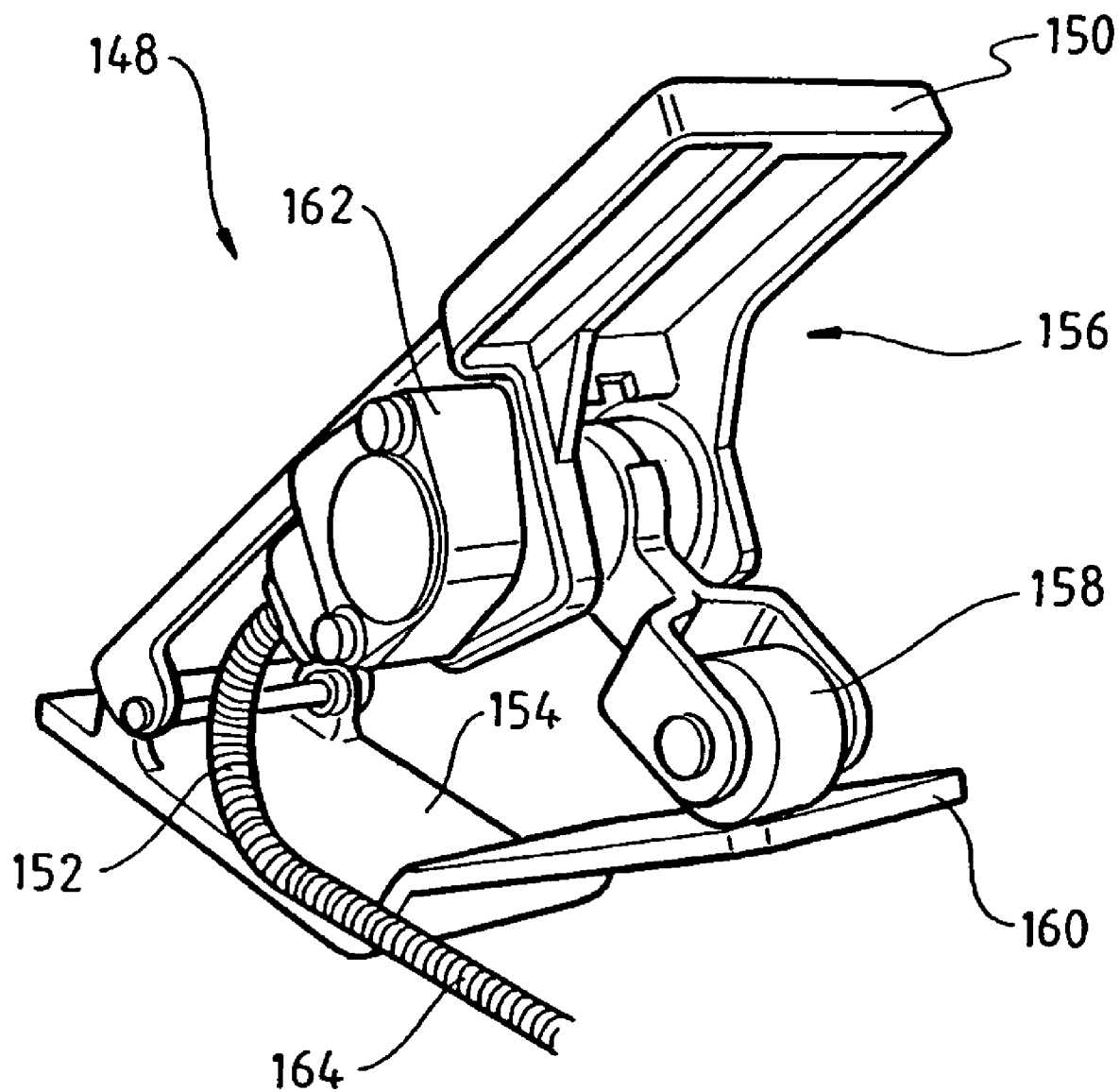
FIG. 7 is a rear perspective view illustrating an electronic throttle control according to the present invention.

If the truck transmission system is a manual one then there must be separate throttle controls since the gearing of the transmission systems would work against each other. However in the case where the engine and transmission system configuration of both the truck and the trailer are automatic, it has been discovered by the present applicant that such a configuration may be controlled by one throttle unit 148 only as illustrated in FIG. 7.

The throttle unit, or electronic throttle control 148 includes a pedal 150 pivoted at 152 on a base 154. A biasing means 156 having a rotatable wheel 158 is pivotably attached to the pedal and rotates along arm 160 to provide resilience for the pedal in operation. Attached to the side of the pedal is a housing 162 housing a potentiometer, a shaft operatively connecting the pedal 150 and the potentiometer so that as the pedal is depressed the potentiometer is rotated, thereby providing a variable voltage output.

Figure 8:
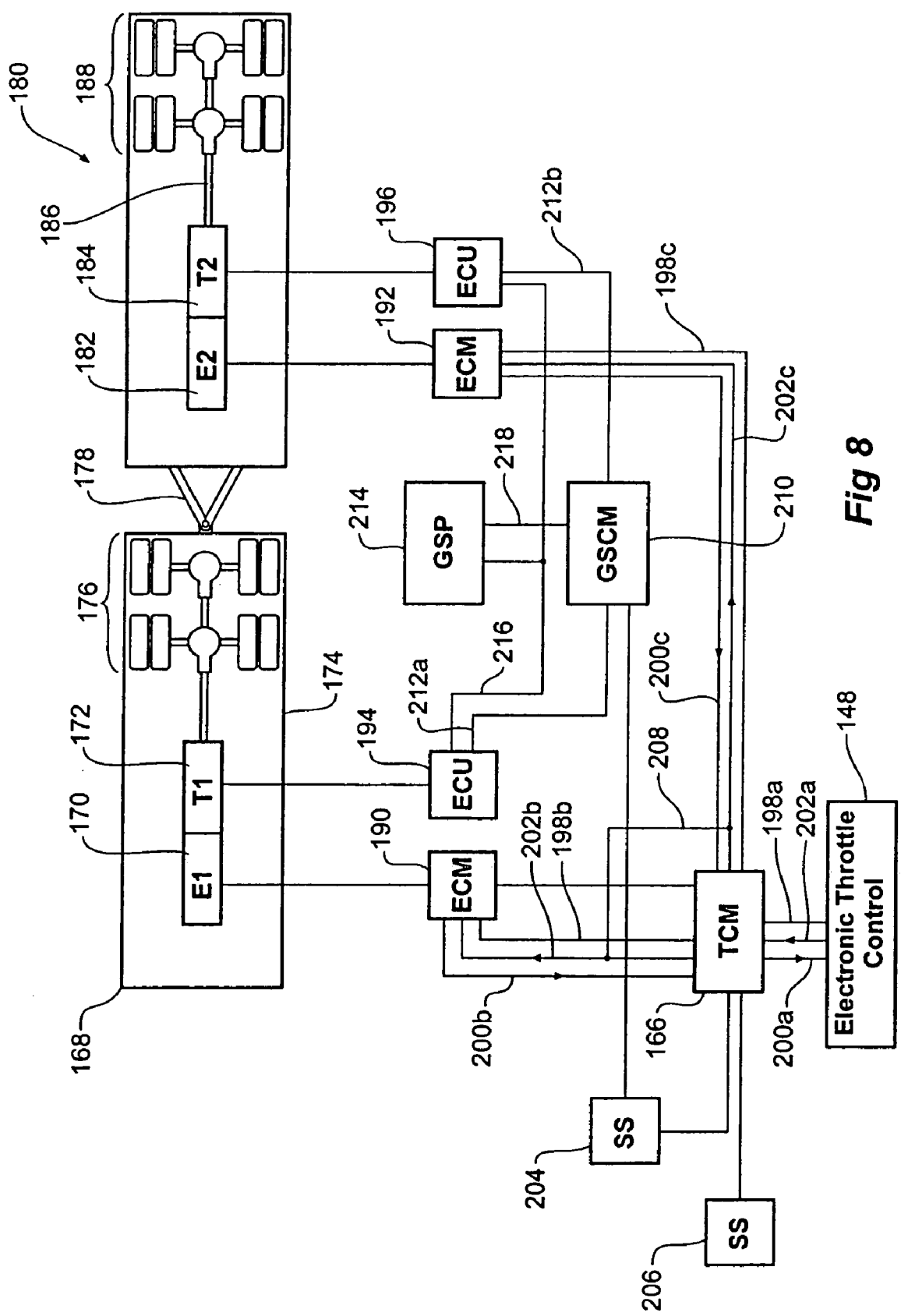
FIG. 8 is a schematic illustration of a multi-combination vehicle and the included system for the control of multiple engines of the vehicle, according to one embodiment of the present invention.

Illustrated in FIG. 8 is a schematic illustration of a multi-combination vehicle and system, according to one embodiment of the present invention, for the control of multiple engines of the multi-combination vehicle. The throttle pedal is electronically connected through cable cluster 164 to a throttle control module (TCM) 166 and is typically provided with power from a truck engine control module (ECM) 190. As discussed above, should the truck engine and its power system fail for whatever reason, an alternative source of power needs to be provided to the electronic throttle control 148 to enable the operator to provide a throttle input to the power trailer engine. The TCM 166 enables the operator to select and alternate power source for the electronic throttle control 148 so that the multi-combination vehicle can still be driven even if one of the engines were to fail. This ability allows the multi-combination vehicle to be at the very least moved out of the way so that other vehicles may use a roadway and at best still deliver any load and be driven to an appropriate area for repair.

With reference to FIG. 8, a first vehicle, typically truck 168 includes engine 170 providing power through transmission system 172 to drive shaft 174 and onto rear axle assembly 176. The truck 168 is mechanically coupled via coupling 178 to power trailer 180 having engine 182 providing power through transmission system 184 to drive shaft 186 and onto rear axle assembly 188.

Each of the engines has an associated Engine Control Module (ECM), ECM 190 coupled to engine 170, and ECM 192 coupled to engine 182. Similarly each transmission has an associated Engine Control Unit (ECU), ECU 194 coupled to transmission 172, and ECU 196 coupled to transmission 184. The ECM and ECU unit of each vehicle are connected to the vehicles' power supply.

As discussed earlier, the electronic throttle control (or pedal 150) 148 is operatively connected to throttle control module (TCM) 166 and includes a ground 198a, power 200a, and variable throttle output 202a. The TCM is operatively coupled to the ECM 190 of the truck and ECM 192 of the power trailer. The truck ECM 190 associated with truck 168 is connected with the TCM to provide power 200b, a common ground 198b whilst receiving the throttle pedal output 202b. Similarly the power trailer ECM 192 associated with power trailer 180 is connected with the TCM to provide power 200c, a common ground 198c whilst receiving the throttle pedal output 202c. Selector switch 204 selects the power input that is fed through the TCM 166 to the electronic throttle control 148, that is, whether electronic throttle control 148 receives power from ECM 190 or ECM 192. A warning system, such as a buzzer and/or light 220 (FIG. 9) is operatively coupled to the selector switch 204 to indicate to an operator when the present configuration of the TCM 166 has failed.

Typically, power is fed from ECM 190 of the truck to TCM 166, although it is to be understood that power may alternatively be supplied from ECM 192 to TCM 166. If ECM 190 senses serious engine problems, such as high temperature or low coolant, ECM 190 shuts the engine 170 down. The operator then operates switch 204 in the event of the power from ECM 190 dying (or limited to battery power) which will re-route power coming from ECM 192 through TCM 166 and to the electronic throttle control 148 to replace the power that previously came from ECM 190 to the electronic throttle control 148 through the TCM 166.

When ECM 190 stops providing power and power is not re-routed from the ECM 192, the power trailer engine 182 will also power down since it will not receive any variable output from the electronic throttle control 148.

Although not shown it is to be understood that various visual and audio indicators may be provided to the operator regarding the status of the ECM's 190 and 192 and electronic throttle control 148 as well as switch 204 at any time. It is to be further understood that switch 204 may also be used to control the display of various parameters from the engine ECM that supplies power to the electronic throttle control 148.

In the event a power take off (PTO) is required, PTO switch 206 coupled to the TCM 166 ensures that the variable throttle output of ETC 148 is disconnected from the ECM to which the PTO is related and the engine speed is limited to a speed less than the maximum speed. The PTO is typically selected when power is needed and the vehicle is not moving, such as when the vehicle is unloading. Those skilled in the art will appreciate that the selector switch 204 is typically an electric switch and the PTO switch 206 typically a pneumatic switch.

One can now appreciate that a single electronic throttle control can be used to operate two engines in a parallel type of arrangement. That is, the engines do not communicate with each other but rather independently from the one electronic throttle control 148. When the ECM of either engine is inoperative, it is not fatal if they are still provided a throttle control signal (i.e. variable throttle output) 202a. Under those circumstances, signals 202b and 202c may be coupled together outside of the TCM 166 through connection 208.

A Gear Selector Control Module 210 (GSCM) is operatively connected to the ECU of both the truck 168 and the power trailer 180 through connections 212a and 212b respectively. The GSCM enables the operator to control both transmissions with a single gear selector panel (GSP) 214, allowing the operator to select any gear, neutral or reverse. The GSCM eliminates the possibility of an operator selecting a gear on a single transmission only, the GSCM enabling the operator with one selection to select the nominated gear in both transmissions 172 and 184.

The GSCM 210 is provided with power from either the truck ECU 194 or the power trailer ECU 192 which then powers the GSP 214. Selector switch 204 is also operatively coupled to the GSCM 210. By selecting the appropriate position on switch 204, power is fed from the power trailer ECU 196 instead of the truck ECU 194 to the GSP 214.

As discussed earlier, if the ECU of a transmission senses a fault it sends the transmission to a safe mode, typically a mode where the transmission remains locked in a direct gear, generally one below high, until the vehicle stops, when the transmission then falls into neutral whilst at the same time locking the GSP 214 and making it inoperable. Under such a circumstance, the selector switch 204 selects power from the trailer ECU 196 instead of the truck ECU 194 thereby ensuring that the GSP is operable, the GSP then being able to control the transmission of the trailer ECU.

This enables a vehicle having multiple transmission where one of the transmissions is in neutral to be drivable. Otherwise, the GSP would be locked into the neutral position and the vehicle would be unmovable since both of the transmissions would be in neutral.

GSP connection 216 includes a large number of independent wires that carry signals. Some of these signals can be provided directly to and from either ECU 194 or 196 and accordingly these can bypass the GSCM 210 since they do not affect the operation of the GSP even if one of the transmissions is in fault. These signals may include common data bits. The gearshift selector displays are selected via the GSCM 210. Other signals 218 that relate to the provision of power and sensor power and other transmission-specific data have to be alternatively selected through the GSCM 210 and are then appropriately provided to the ECU's, signal 212a feeding ECU 194 and signal 212b feeding ECU 196.

Figure 9:
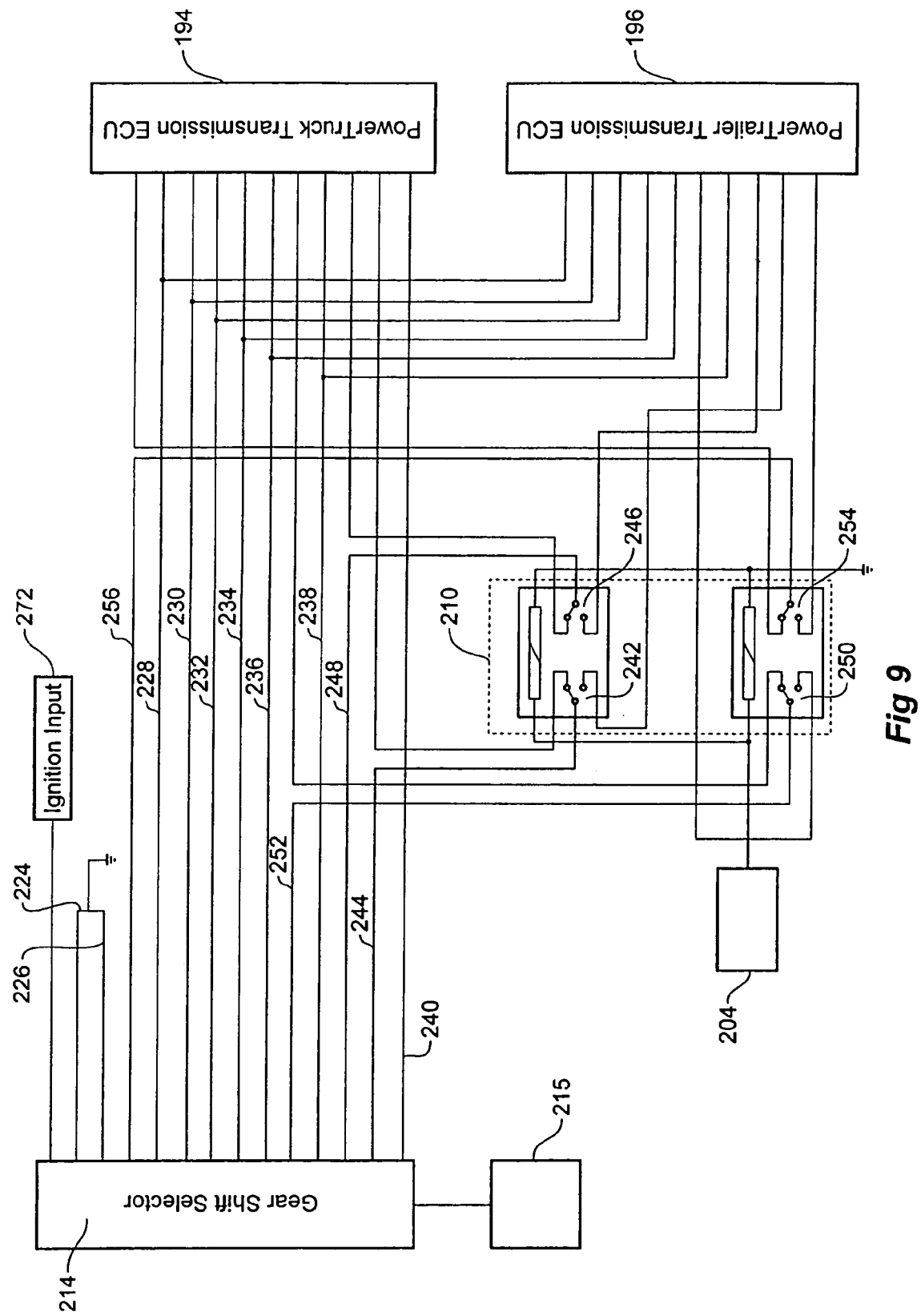
FIG. 9 is a schematic further illustrating the gear selector control module shown in FIG. 8.

FIG. 9 illustrated in more detail the operation of the GSCM 210 and GSP 214. The GSP 214 includes a number of inputs and outputs such as ignition input 222 and two outputs 224 and 226 related to the background lighting of the GSP. A number of other connections are wired in parallel to both the truck ECU 194 and trailer ECU 196 including data bit 228, data bit 230, data bit 232, data bit 234, parity 236, and shift selector mode input 238. General purpose output 240 is connected to truck ECU 194 only.

Four connections from the GSP 214 are coupled to the GSCM 210 and are alternatively selected by the relays in the GSCM to be connected to the truck ECU 194 or the trailer ECU 196.

Relay 242 operatively connects the GSM's power input line 244 to the ECU's, relay 246 connects the sensor power line 248 to the ECU's, relay 250 connects the shift selector display line 252 to the ECU's, and relay 254 connects power return line 256 to the ECU's. In the relaxed position of GSCM 210, as illustrated in FIG. 9, these four lines 244, 248, 252, and 256 are operatively coupled to the truck ECU 194, whilst in the energized position they are operatively connected to the trailer ECU 196. Diagnostic information from the ECU that powers the GSP may be displayed on display 215.

Those skilled in the art will now appreciate that the GSP 214 is provided with power from either ECU 194 or ECU 196 depending on the selector switch 204. If for whatever reason one of the ECU's fails to function properly, the operator may select the other ECU to provide power to the GSP and operate that other functioning ECU as normal, ensuring that the transmission coupled to the functioning ECU does not enter safe mode which, combined with the failure of the other ECU, would cause the vehicle to be totally inoperable.

It is also to be understood that although the selector switch 204 has been shown to be operatively coupled to both the TCM 166 and the GSCM 210, there could very well be two separate switches controlling the TCM 166 and GSCM 210 independently.

Figure 10:
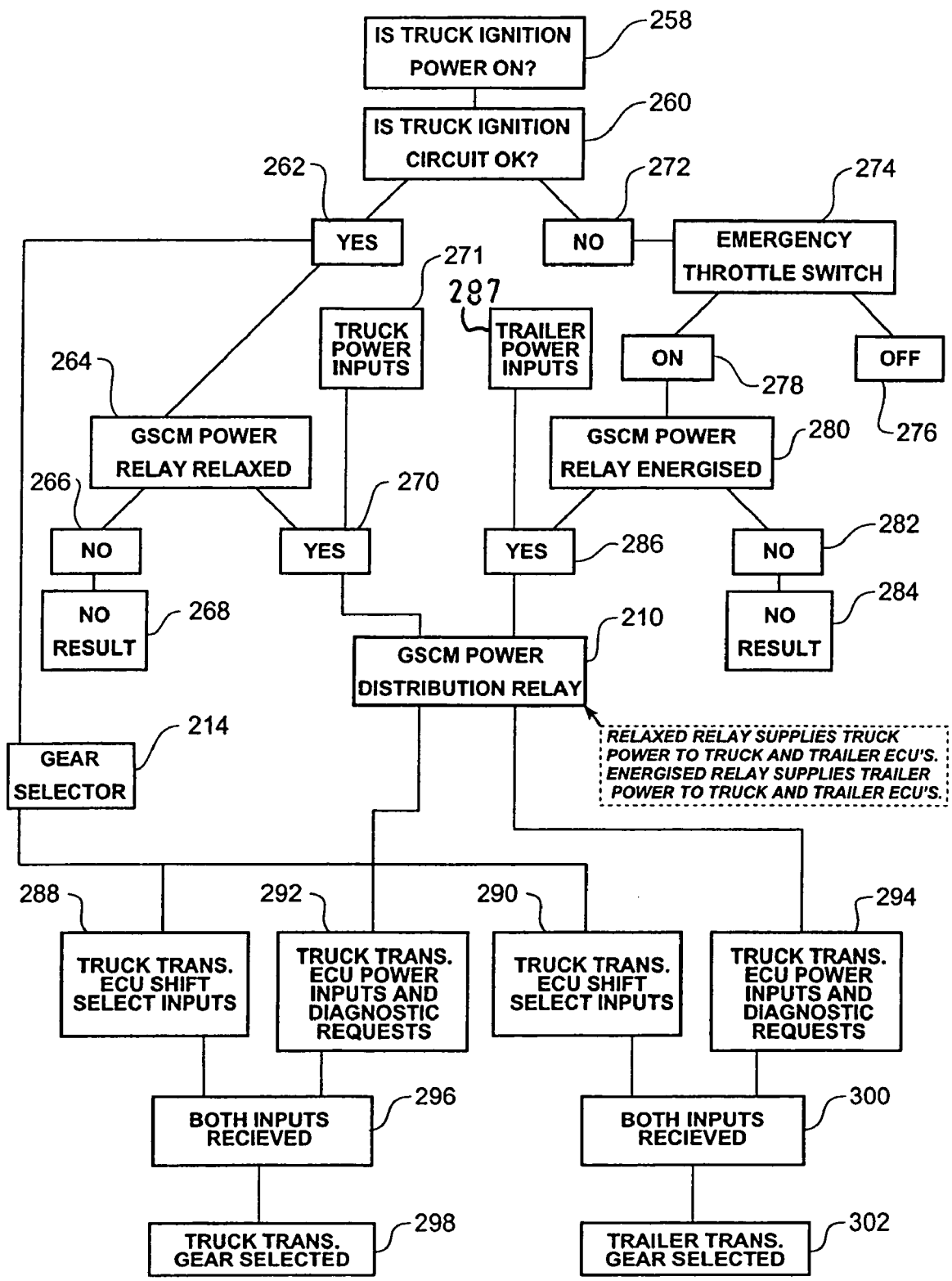
FIG. 10 is a flow chart illustrating the gear selector control module according to the embodiment of the present invention illustrated in FIG. 9.

FIG. 10 is a flow chart illustrating the logic behind the operation of the GSCM 210. If the Truck Ignition Power is "On" (see block 258), a check is performed to see if the Truck Ignition Circuit is OK (see block 260). If the Truck Ignition Circuit is OK (see "Yes" block 262), the Gear Selector Panel 214 is supplied with power. The question is then whether the GSCM relays are energized (see block 264). If the GSCM relays are not relaxed (see block 266), then there is no result (see block 268). If the GSCM relays are relaxed (see "Yes" block 270), then power to the GSCM 210 (and thence through the relays to GSP 214) is provided from the truck ECU 194 (see block 271).

If the truck ignition is not OK (see "No" block 272), the question is whether the emergency switch is On or Off (see-block 274). If the switch is Off (see block 276) the system has not been activated. If the switch 204 (see block 274) is On (see block 278), the question is then whether the GSCM relays are energized (see block 280). If the relays have not been energized (see block 282), then there is no result (see block 284). If the relays have been energized (see "yes" block 286), then power to the GSCM 210 (and thence through the relays to GSP 214) is fed from the trailer ECU 196 power supply (see block 287).

Those skilled in the art will now appreciate that when the GSCM relays are relaxed, power is supplied from the truck ECU 194 to the GSP 214, whilst when the relays are energized, power to the GSP 214 is provided by the trailer ECU 196.

The GSP 214 further includes a display unit 215 (FIG. 9) that provides the operator of the vehicle with information as to the current state of the transmission that is connected to the GSP 214 by GSCM 210. The emergency switch 204 also affects this so that the display 215 on the GSP 214 relates to the transmission of that vehicle that supplies power to the GSP.

Referring further to FIG. 10, the GSP 214 provides both the truck transmission ECU shift select input (see block 288) to the truck ECU 194, and the trailer transmission ECU shift select input (see block 290) to the trailer ECU, whilst the GSCM 210 provides to GSP 214, depending on the position of the switch 204, the truck transmission ECU power inputs and provides diagnostic request (see block 292, or the trailer transmission ECU power input and diagnostic request (see block 294).

If the truck shift select input (see block 288) and the truck ECU power input (see block 292) are both present and received (as indicated by block 296), then the truck transmission gear is selected (as shown in block 298), otherwise if the trailer shift select input (see block 290) and the trailer ECU power input (see block 294) are present and received (as indicated by block 300), then the trailer transmission gear is selected (as shown in block 302).

Figure 11:
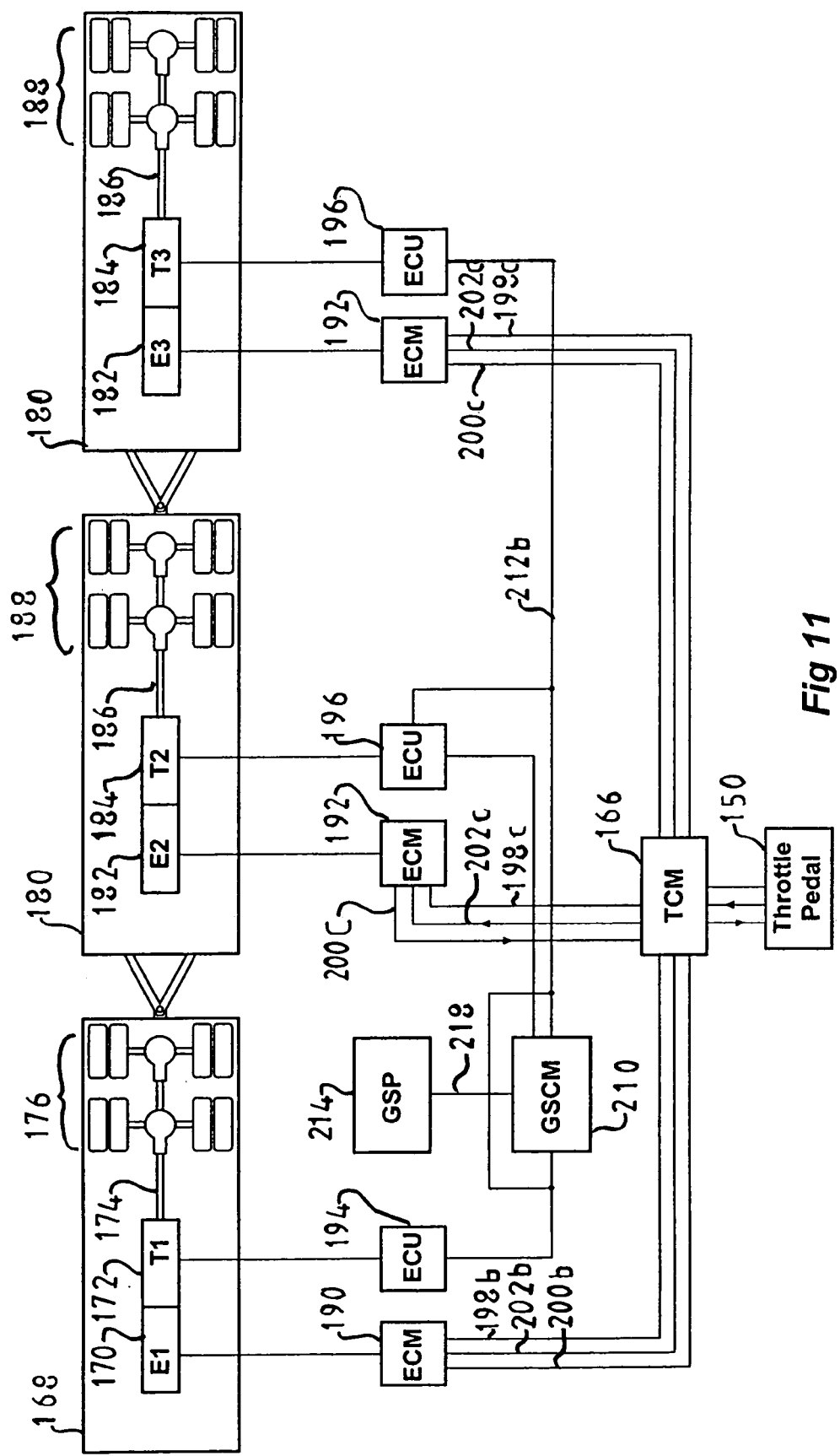
FIG. 11 illustrates a system for the control of a multi-combination vehicle similar to FIG. 8, but with the addition of a third power trailer.

Illustrated in FIG. 11 is a schematic diagram showing a truck operatively coupled to two power trailers. As was the case for FIG. 8, the TCM 166, and GSCM 210 enable power to be supplied from one of the three separate units, the power initially being supplied by the truck ECU 194.

It is to be understood that reference in the present specification to a power source may include a battery that is connected in series to the power source of the engines, the engine power sources feeding the battery that than links to the various modules and control units.

Those skilled in the art will appreciate that the present invention complements and further enhances the multi-combination vehicles whose details were described in the United States and International Applications discussed earlier and that provide significant advantages and cost savings when hauling ore.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

What is claimed is:

1. A multi-combination vehicle, comprising:

at least first and second transmissions, said first transmission including a first electronic control unit, said second transmission including a second electronic control unit;

at least first and second engines, said first engine being coupled to said first transmission, said first engine including a first electrical power source adapted to provide first power to said first electronic control unit, said second engine being coupled to said second transmission, said second engine including a second electrical power source adapted to provide second power to said second electronic control unit;

an electronic gear selector, said electronic gear selector being in communication with said first and second transmissions, said gear selector including a power input and a gear selector output; and a gear selector module, said gear selector module being provided third power from at least one of said first and second electronic control units, said gear selector module being adapted to provide fourth power to said gear selector power input, said gear selector module including a manual switching device, said manual switching device being adapted to selectively provide said third power from a selected one of said first and second electronic control units.

2. A multi-combination vehicle, comprising:

at least first and second transmissions, said first transmission including a first electronic control unit, said second transmission including a second electronic control unit, said first transmission including a first mode and said second transmission including a second safe mode;

at least first and second engines, said first engine being coupled to said first transmission, said first engine including a first electrical power source adapted to provide first power to said first electronic control unit, said second engine being coupled to said second transmission, said second engine including a second electrical power source adapted to provide second power to said second electronic control unit;

an electronic gear selector, said electronic gear selector being in communication with said first and second transmissions, said gear selector including a power input and a gear selector output; and a gear selector module, said gear selector module being provided third power from at least one of said first and second electronic control units, said gear selector module being adapted to provide fourth power to said gear selector power input.

3. A multi-combination vehicle, comprising:
at least first and second transmissions, said first transmission including a first electronic control unit, said second transmission including a second electronic control unit, said first transmission including a first mode and said second transmission including a second safe mode;
at least first and second engines, said first engine being coupled to said first transmission, said first engine including a first electrical power source adapted to provide first power to said first electronic control unit, said second engine being coupled to said second transmission, said second engine including a second electrical power source adapted to provide second power to said second electronic control unit;
an electronic gear selector, said electronic gear selector being in communication with said first and second transmissions, said gear selector including a power input and a gear selector output; and
a gear selector module, said gear selector module being provided third power from at least one of said first and second electronic control units, said gear selector module being adapted to provide fourth power to said gear selector power input, said first electronic control unit being in communication with said first engine and being adapted to sense at least a first engine fault, said first electronic control unit being further adapted to place said first engine in said first safe mode upon sensing said first engine fault.

4. A multi-combination vehicle, comprising:
at least first and second transmissions, said first transmission including a first electronic control unit, said second transmission including a second electronic control unit, said first transmission including a first mode and said second transmission including a second safe mode;
at least first and second engines, said first engine being coupled to said first transmission, said first engine including a first electrical power source adapted to provide first power to said first electronic control unit, said second engine being coupled to said second transmission, said second engine including a second electrical power source adapted to provide second power to said second electronic control unit;
an electronic gear selector, said electronic gear selector being in communication with said first and second transmissions, said gear selector including a power input and a gear selector output; and
a gear selector module, said gear selector module being provided third power from at least one of said first and second electronic control units, said gear selector module being adapted to provide fourth power to said gear selector power input, said second electronic control unit being in communication with said second engine and being adapted to sense at least a second engine fault, said second electronic control unit being further adapted to place said second engine in said second safe mode upon sensing said second engine fault.

* * * * *